United States Patent [19]

Nicholas et al.

[11] 4,143,478
[45] Mar. 13, 1979

[54] VARIABLE FLOATING HIDDEN HOOK FISHING LURE

[76] Inventors: Charles P. Nicholas, 56 President St., Lynn, Mass. 01902; Richard Hooper, 216 Central St., Georgetown, Mass. 01833

[21] Appl. No.: 792,700

[22] Filed: May 2, 1977

[51] Int. Cl.² ............................................. A01K 85/00
[52] U.S. Cl. ...................................... 43/42.1; 43/42.41
[58] Field of Search ................... 43/42.1, 42.41, 42.4, 43/42.43, 42.35, 42.37

[56] References Cited

U.S. PATENT DOCUMENTS

| | | | |
|---|---|---|---|
| 994,927 | 6/1911 | Jefferson | 43/42.1 |
| 1,110,956 | 9/1914 | McBride | 43/42.1 |
| 1,786,568 | 12/1930 | Kutz | 43/42.1 |
| 1,846,538 | 2/1932 | Albers et al. | 43/42.1 |
| 2,027,069 | 1/1936 | Sorenson | 43/42.1 |
| 2,306,181 | 12/1942 | Neuman | 43/42.1 |
| 2,325,107 | 7/1943 | Burns | 43/42.1 |
| 3,230,656 | 1/1966 | Kozjak | 43/42.1 |
| 3,748,774 | 7/1973 | Bryant | 43/42.1 |

Primary Examiner—Nicholas P. Godici
Assistant Examiner—Roscoe V. Parker
Attorney, Agent, or Firm—Stanley B. Kita

[57] ABSTRACT

A snag-resistant fishing lure of simple three-piece construction has a body which normally conceals a hook until such time as a fish strikes and exposes the tip of the hook. The lure has an elongated rigid back member and a belly-like member fabricated of relatively thin flexible material and mounted below the back member to form a cavity for containing and concealing the tip of the hook. The bottom of the belly member has a slot which registers with the tip of the hook and through which the tip protrudes when a fish strikes the lure and compresses the belly against the back ahead of the tip. The tip lies within the slot and is angled downwardly and forwardly for cooperating with the rigid back to provide a self-setting action when struck by a fish. The lure is designed to float when stationary on the water; however, the leading ends of the back and belly members have an upwardly and rearwardly inclined surface designed to cause the lure to dive when pulled through the water.

1 Claim, 6 Drawing Figures

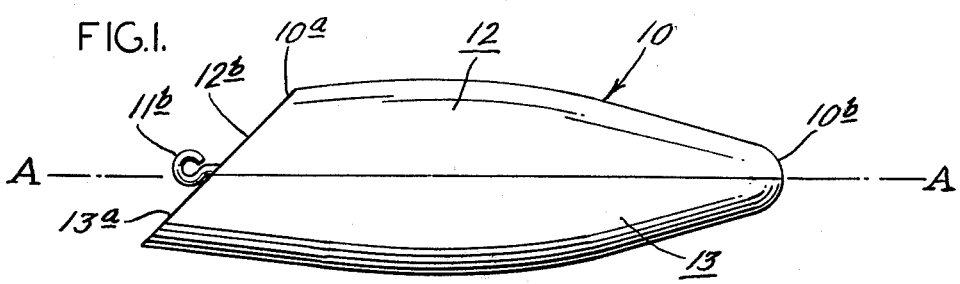
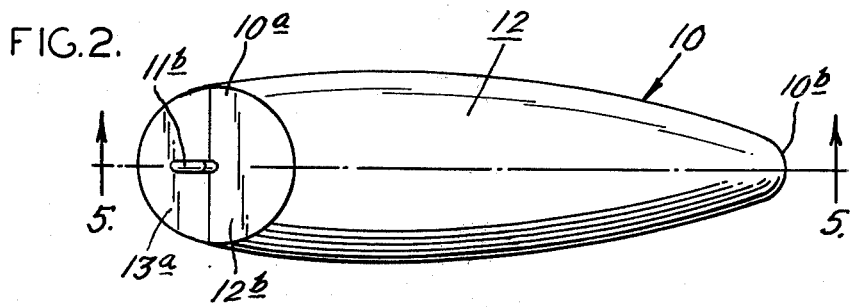
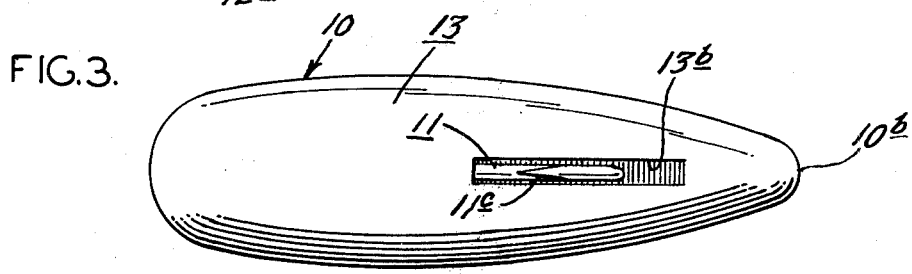
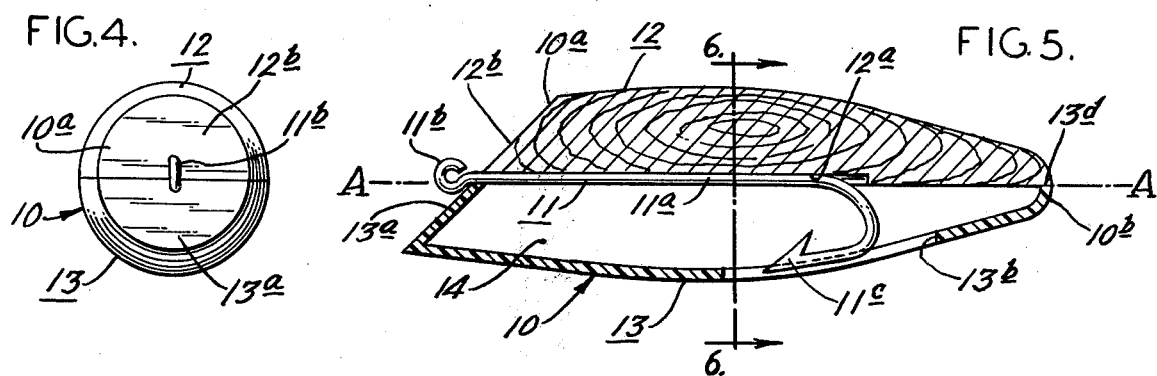
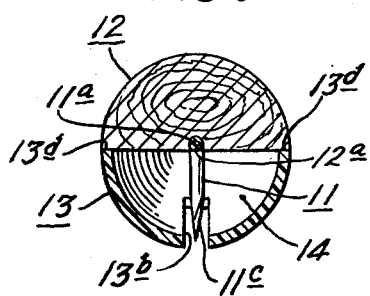

VARIABLE FLOATING HIDDEN HOOK FISHING LURE

The present invention relates to fishing lures, and more particularly, the present invention relates to snag-resistant fishing lures having concealed hooks.

Fishing lures having concealed hooks are known. Examples of such lures are disclosed in the following U.S. Pat. Nos.: 994,927; 1,110,956; 1,846,538; 2,027,069; 2,306,181; 1,786,568; 2,325,107; 3,230,656; 3,748,774. Although each of these patented lures may function satisfactorily for its intended purpose, there is a continuing demand for an effective yet inexpensive fishing lure which has a hidden hook and a variable floating action yet which can be manufactured easily and inexpensively.

In recent years, lures which have both floating and diving capabilities when pulled through the water with a jerking motion have been popular with fishermen. Many of these lures, however, have one or more clusters of hooks which dangle from the lure. The hooks have a proclivity for snagging when the lure is pulled through the water so that this type of lure is not particularly suited for fishing in waters which are overburdened with lily pads and/or underwater vegetation. Furthermore, in addition to the problem of snagging, it is believed that the exposed hooks render these lures less effective than would be the case if the hooks were concealed.

With the foregoing in mind, an object of the present invention is to provide a novel fishing lure which is effective in use.

Another object of the present invention is to provide a floating/diving fishing lure which provides a hook self-setting action when struck by a fish so as not to require a line jerking action to catch the striking fish.

It is another object of the present invention to provide an improved fishing lure which is snag-resistant and is, therefore, particularly suited for use in waters having a substantial amount of surface and/or submerged vegetation, rocks, stumps, etc.

A further object of the present invention is to provide a floating and diving fishing lure entailing a three piece design concept which is of relatively simple construction and which can be manufactured economically.

More specifically, the present invention provides a fishing lure having an elongated fish-attracting body with a hook concealed therein. The lure comprises an elongated rigid back member, a hook having its shank mounted centrally to the underside of the back member and its tip depending therefrom at an acute angle, and a flexible, thin-wall, concave belly for containing and concealing the tip of the hook. The belly member has an elongated slot in its bottom through which the tip portion of the hook protrudes when the belly ahead of the tip is compressed against the back by a striking fish. The tip of the hook is disposed at an acute angle with respect to the hook shank to provide a self-setting action. The tip of the hook is located parallel to the walls of the slot and lies therewithin to prevent interference of the flexible belly with the hook tip when a fish strikes. The density of the lure is selected to cause it to float when stationary in the water; however, the back and belly members have upwardly and rearwardly inclined surfaces at the leading end of the lure for causing the lure to dive under the water when pulled. Of course, this aspect of the design may be modified to provide a different action for different species of fish.

These and other objects, features and advantages of the present invention should become apparent from the following description when taken in conjunction with the accompanying drawing in which:

FIG. 1 is a side elevational view of a fishing lure embodying the present invention;

FIG. 2 is a plan view thereof;

FIG. 3 is an inverted plan view thereof;

FIG. 4 is a front elevational view thereof;

FIG. 5 is a sectional view taken on line 5—5 of FIG. 2; and

FIG. 6 is a sectional view taken on line 6—6 of FIG. 5.

Referring now to the drawing, FIG. 1 illustrates a fishing lure 10 which embodies the present invention. As best seen therein, the lure 10 has a horizontally-elongated profile with a leading end 10a truncated at an angle to incline in an upward and rearward direction. The lure 10 has a somewhat bulbous mid-portion which tapers rearwardly to terminate in an ogive-shaped trailing end 10b. The lure 10 has a vertical cross section which varies from oval to circular at different locations throughout its length, having a substantially circular cross section, such as illustrated in FIG. 6, at about the mid-point of the lure. Preferably, the body of the lure is painted a suitable color with or without spots, stripes, etc. to provide a fish-attracting display.

According to the present invention, the lure 10 is effective and snag-resistant in use. To this end, the lure 10 includes a hook 11 which is concealed within the lure so as normally to be invisible from view as the lure is being pulled through the water. The lure 10 is designed, however, to expose the hook 11 when struck by a fish. For this purpose, the lure 10 comprises an upper or back member 12 and a lower or belly member 13 carried below the back member 12. The hook 11 has a shank 11a with an eye 11b protruding forwardly of the lure 10 for connection to a fishing line, and the hook 11 has a tip portion 11c inclined at an acute angle with respect to the shank 11a and located intermediate the ends of the back member 12. The shank 11a is supported along substantially its entire length in a groove 12a in the underside of the back member 12, and the shank 11a may be secured in the groove 12a by any of several different means, including adhesives, staples, etc. The tip portion 11c of the hook 11 is preferably disposed at an angle of about 10° with respect to the shank 11a to provide a self-setting action when the lure is struck by a fish.

In order normally to conceal the tip portion 11c of the hook 11 from view by fish, the belly member 13 has a concave shape providing a cavity 14 below the back member 12 for containing the hook tip 11c. Preferably, the belly member 13 is molded of a resiliently flexible material such as neoprene. The belly member 13 has a front wall 13a the outer surface of which forms a lower extension of the leading end surface 12b of the back member 12 with both surfaces being inclined at an angle of about 45° with respect to the longitudinal axis A of the lure 10. The inclined surfaces 13a and 12b function to cause the lure 10 to dive when pulled forwardly through the water.

In order to expose the tip portion 11c of the hook 11 when a fish strikes, the bottom of the belly member 13 has an elongated slot 13b which registers with the tip portion 11c of the hook 11. The slot 13b is dimensioned so as to cause the tip 11c to protrude through the belly 13 when the belly 13, ahead of the tip 11c, is compressed upwardly against the hook shank 11a and back 12, such as when a fish strikes the lure 10. The tip portion 11c of the hook 11 is recessed slightly above the bottom of the belly 13 and lies parallel to and within the slot to insure its concealment and protection from snagging and to prevent its interference with the belly 13 when a fish strikes. The thickness of the wall of the belly 13, and the stiffness of the material from which it is molded, are designed to cause the belly 13 to resist upward deflection due to water forces on the belly as the lure is being pulled through the water while affording minimum resistance to upward deflection when engaged between the jaws of a fish. Thus, the tip of the hook is normally concealed in the body of the lure yet is capable of being extended readily for catching a fish.

By way of example, the back member 12 is preferably fabricated from white cedar wood, and the belly member 13 is molded of an elastomeric material such as neoprene having a relatively-thin wall thickness of about 0.040 inches. The belly member 13 has a peripheral edge 13d which is preferably bonded to the underside of the back member 12 along its peripheral margin by an adhesive, such as Super Glue-3. The total weight of the lure is preferably about 0.133 oz. The overall length of the lure measured along its axis A is about 2½". The diameter of the cross section of the lure is about 13/16" at about its longitudinal median (FIG. 6). The aforementioned dimensional and other relations are given by way of examples only, it being understood that the size of the lure may vary, depending upon the size of the fish to be caught.

While a preferred embodiment of the present invention has been described in detail, various modifications, alterations, and changes may be made without departing from the spirit and scope of the present invention as defined in the appended claims.

We claim:
1. A fishing lure, comprising:
a relatively rigid back member fabricated of buoyant material,
a hook having an elongated shank mounted along substantially its entire length to the underside of said back member, a tip portion depending therefrom intermediate the ends of the back member, and an integral eye in front of the back member,
a belly member having a relatively thin flexible wall of elastomeric material depending from the periphery of said back member for cooperating therewith to define a cavity for containing and concealing the tip portion of said hook,
said belly member having a slot below the tip of the hook sized to permit passage therethrough of the tip when the belly member is compressed upwardly toward the back member by a striking fish,
said back member having a rearwardly-inclined leading end surface and said belly member having an upwardly and rearwardly inclined leading end surface forming a lower extension of said back member leading surface for causing the lure to dive when pulled through the water,
said tip of said hook being inclined at an acute angle relative to the back member and being fixedly mounted thereto in depending relation therefrom so as to provide a self-setting hooking action irrespective of the striking angle of a fish.

* * * * *